United States Patent
Uchida et al.

(10) Patent No.: US 11,394,868 B2
(45) Date of Patent: Jul. 19, 2022

(54) IMAGING DEVICE, IMAGING METHOD, AND PROGRAM

(71) Applicant: FUJIFILM Corporation, Tokyo (JP)

(72) Inventors: Akihiro Uchida, Saitama (JP); Koichi Tanaka, Saitama (JP); Kenkichi Hayashi, Saitama (JP); Shinichiro Fujiki, Saitama (JP); Seiichi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 210 days.

(21) Appl. No.: 16/830,059

(22) Filed: Mar. 25, 2020

(65) Prior Publication Data
US 2020/0228725 A1 Jul. 16, 2020

Related U.S. Application Data

(63) Continuation of application No. PCT/JP2018/024239, filed on Jun. 26, 2018.

(30) Foreign Application Priority Data

Sep. 27, 2017 (JP) ............................. JP2017-186448

(51) Int. Cl.
*H04N 5/232* (2006.01)

(52) U.S. Cl.
CPC .... *H04N 5/232127* (2018.08); *H04N 5/23296* (2013.01); *H04N 5/232123* (2018.08)

(58) Field of Classification Search
CPC ........ H04N 5/232127; H04N 5/232123; H04N 5/23296; H04N 5/232125; G02B 7/36; G02B 7/282; G03B 13/36
See application file for complete search history.

(56) References Cited

U.S. PATENT DOCUMENTS

| 11,202,013 | B2 * | 12/2021 | Toyoda | ............... H04N 5/23245 |
| 2004/0130648 | A1 | 7/2004 | Kikuchi et al. | |
| 2006/0120709 | A1 * | 6/2006 | Kobayashi | ....... H04N 5/232125 |
| | | | | 396/80 |

(Continued)

FOREIGN PATENT DOCUMENTS

| CN | 1444736 A | 9/2003 |
| CN | 104427247 A | 3/2015 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2018/024239, dated Apr. 9, 2020, with English translation.

(Continued)

*Primary Examiner* — John Villecco

(74) *Attorney, Agent, or Firm* — Birch, Stewart, Kolasch & Birch, LLP

(57) ABSTRACT

An imaging device acquires a focal length of an imaging lens; and in performing of zoom tracking control to change a state of the focus lens of the imaging lens according to the acquired focal length, in a case where a change of the acquired focal length is detected, varies a criterion in the zoom tracking control depending on whether autofocus is being executed or not.

13 Claims, 11 Drawing Sheets

(56) References Cited

U.S. PATENT DOCUMENTS

| | | | |
|---|---|---|---|
| 2010/0141801 A1 | 6/2010 | Okamoto et al. | |
| 2014/0341553 A1* | 11/2014 | Kikuchi | H04N 5/232123 |
| | | | 396/81 |
| 2015/0062717 A1 | 3/2015 | Okawa et al. | |
| 2017/0237893 A1* | 8/2017 | Kishida | H04N 5/23209 |
| | | | 348/240.3 |
| 2019/0129134 A1* | 5/2019 | Chino | G03B 3/10 |
| 2020/0275014 A1* | 8/2020 | Kamba | H04N 5/23212 |
| 2020/0409026 A1* | 12/2020 | Fujiki | G03B 13/36 |
| 2021/0243373 A1* | 8/2021 | Toyoda | H04N 5/23212 |
| 2022/0060631 A1* | 2/2022 | Toyoda | H04N 5/23241 |

FOREIGN PATENT DOCUMENTS

| | | | | |
|---|---|---|---|---|
| JP | 6-217181 A | | 8/1994 | |
| JP | 2006-162821 A | | 6/2006 | |
| JP | 2012-255910 A | | 12/2012 | |
| JP | 2012255910 A | * | 12/2012 | |
| JP | 2014-222305 A | | 11/2014 | |
| JP | 2015-45676 A | | 3/2015 | |
| JP | 2015176039 A | * | 10/2015 | |
| KR | 20060121436 A | * | 11/2006 | |
| KR | 20070016351 A | * | 2/2007 | |
| KR | 101293245 B1 | * | 8/2013 | |
| WO | WO-2013105479 A1 | * | 7/2013 | G02B 7/282 |

OTHER PUBLICATIONS

International Search Report (Form PCT/ISA/210) for International Application No. PCT/JP2018/024239, dated Oct. 2, 2018, with English translation.

Chinese Office Action and Search Report for corresponding Chinese Application No. 201880062581.8, dated Jun. 1, 2021, with English translation of the Office Action.

* cited by examiner

IMAGING DEVICE, IMAGING METHOD, AND PROGRAM

CROSS-REFERENCE TO RELATED APPLICATIONS

This application is a continuation application of International Application No. PCT/JP2018/024239, filed Jun. 26, 2018, the disclosure of which is incorporated herein by reference in its entirety. Further, this application claims priority from Japanese Patent Application No. 2017-186448, filed Sep. 27, 2017, the disclosure of which is incorporated herein by reference in its entirety.

BACKGROUND

1. Technical Field

A technique of the present disclosure relates to an imaging device, an imaging method, and a program.

2. Related Art

In the related art, an imaging device comprising a zoom tracking unit that executes a zoom tracking control for moving a focus adjustment lens according to the drive of a zoom lens is disclosed (refer to JP2012-255910A). In a case where the drive of the zoom lens is detected while the focus adjustment lens is driven in order to detect a focus state of an optical system, the imaging device stops the drive of the focus adjustment lens and causes the zoom tracking unit to execute the zoom tracking control.

An imaging device comprising a memory that holds data of an imaging range where imaging by focusing using a cam curve of a lens is ensured; and a control unit that moves a focus lens in conjunction with the zoom lens is disclosed (refer to JP2006-162821A). In a case where a focal depth detected by the position of the zoom lens is less than the imaging range at the position of the zoom lens, the imaging device drives the focus lens by an autofocus control using an evaluation value indicating a focusing degree. Further, in a case where the focal depth detected by the position of the zoom lens is greater than the imaging range at the position of the zoom lens, the imaging device drives the focus lens by the cam curve in the data of the imaging range.

SUMMARY

In the imaging device including the zoom lens and the focus lens, in a case where a zoom operation is performed during the execution of the autofocus, the zoom tracking control is performed based on the position of the focus lens during the autofocus, and as a result, focusing accuracy may be reduced in some cases. On the other hand, it is considered that in a case where the zoom operation is performed during the execution of the autofocus, the autofocus is interrupted, the focus lens is returned to the position before the execution of the autofocus, and then the zoom tracking control is performed.

However, in such a case, in order to suppress a decrease in focusing accuracy, the autofocus is executed again after the zoom tracking control is performed, and thus the control time of the imaging device becomes longer.

An embodiment of the invention is made in view of the above circumstances, and is to provide an imaging device, an imaging method, and a program which can suppress a decrease in focusing accuracy while reducing control time of the imaging device.

An imaging device of the present disclosure comprises: an imaging lens having an imaging optical system including a focus lens; an acquisition unit that acquires a focal length of the imaging lens; and a control unit that performs zoom tracking control to change a state of the focus lens according to the focal length acquired by the acquisition unit, in which in a case where a change of the focal length acquired by the acquisition unit is detected, the control unit varies a criterion in the zoom tracking control depending on whether autofocus is being executed or not.

In the imaging device of the present disclosure, in a case where the autofocus is not being executed, the control unit may perform the zoom tracking control based on a current position of the focus lens, and in a case where the autofocus is being executed, the control unit may perform the zoom tracking control based on a position of the focus lens before execution of the autofocus.

In the imaging device of the present disclosure, in a case where the autofocus is being executed, the control unit may change control on the basis of a driving amount of the focus lens at a time of performing the zoom tracking control based on the position of the focus lens before execution of the autofocus.

In the imaging device of the present disclosure, in a case where a change of the focal length acquired by the acquisition unit is detected and the autofocus is being executed, when the driving amount of the focus lens at the time of performing the zoom tracking control based on the position of the focus lens before execution of the autofocus is equal to or less than a threshold value, the control unit may continue the autofocus, and when the driving amount exceeds the threshold value, the control unit may interrupt the autofocus and performs the zoom tracking control based on the position of the focus lens before execution of the autofocus.

In the imaging device of the present disclosure, the threshold value may be a value less than a distance between consecutive positions at a time of deriving an evaluation value of the autofocus while changing the position of the focus lens.

In the imaging device of the present disclosure, in a case where a change of the focal length acquired by the acquisition unit is detected and the autofocus is being executed, when a peak value of an evaluation value of the autofocus has been detected, the control unit may interrupt the autofocus and perform the zoom tracking control based on the position of the focus lens where the evaluation value is the peak value, and when the peak value of the evaluation value has not been detected, the control unit may perform control to continue the autofocus.

In the imaging device of the present disclosure, in a case where a change of the focal length acquired by the acquisition unit is detected and the autofocus is being executed, when a search direction of the autofocus is opposite to a driving direction of the focus lens associated with the zoom tracking control, the control unit may interrupt the autofocus and perform the zoom tracking control based on the position of the focus lens before execution of the autofocus, and when the search direction is the same as the driving direction, the control unit may perform control to continue the autofocus.

In the imaging device of the present disclosure, in a case where a change of the focal length acquired by the acquisition unit is detected, the autofocus is being executed, and the autofocus is continued, the control unit may perform control to perform the autofocus by changing an end position of a search range of the autofocus by the driving amount of the focus lens associated with the zoom tracking control.

In the imaging device of the present disclosure, in a case where a change of the focal length acquired by the acquisition unit is detected and the autofocus is not being executed, the control unit may perform the zoom tracking control based on the current position of the focus lens.

An imaging method of the present disclosure is an imaging method executed by an imaging device comprising an imaging lens having an imaging optical system including a focus lens. The imaging method comprises acquiring a focal length of the imaging lens; and in performing of zoom tracking control to change a state of the focus lens according to the acquired focal length, in a case where a change of the acquired focal length is detected, varying a criterion in the zoom tracking control depending on whether autofocus is being executed or not.

A program of the present disclosure is a program causing a computer of an imaging device comprising an imaging lens having an imaging optical system including a focus lens to execute processing of: acquiring a focal length of the imaging lens; and in performing of zoom tracking control to change a state of the focus lens according to the acquired focal length, in a case where a change of the acquired focal length is detected, varying a criterion in the zoom tracking control depending on whether autofocus is being executed or not.

Further, an imaging device of the present disclosure includes a processor and a memory. The memory stores a command for causing a computer of the imaging device comprising an imaging lens having an imaging optical system including a focus lens to execute processing of: acquiring a focal length of the imaging lens; and in performing of zoom tracking control to change a state of the focus lens according to the acquired focal length, in a case where a change of the acquired focal length is detected, varying a criterion in the zoom tracking control depending on whether autofocus is being executed or not. The processor executes the command.

According to an embodiment of the invention, it is possible to suppress a decrease in focusing accuracy while reducing control time of an imaging device.

BRIEF DESCRIPTION OF THE DRAWINGS

Exemplary embodiments according to the technique of the present disclosure will be described in detail based on the following figures, wherein.

DETAILED DESCRIPTION

Hereinafter, embodiments for implementing the technique of the present disclosure will be described in detail with reference to the drawings.

First Embodiment

Figure 1:
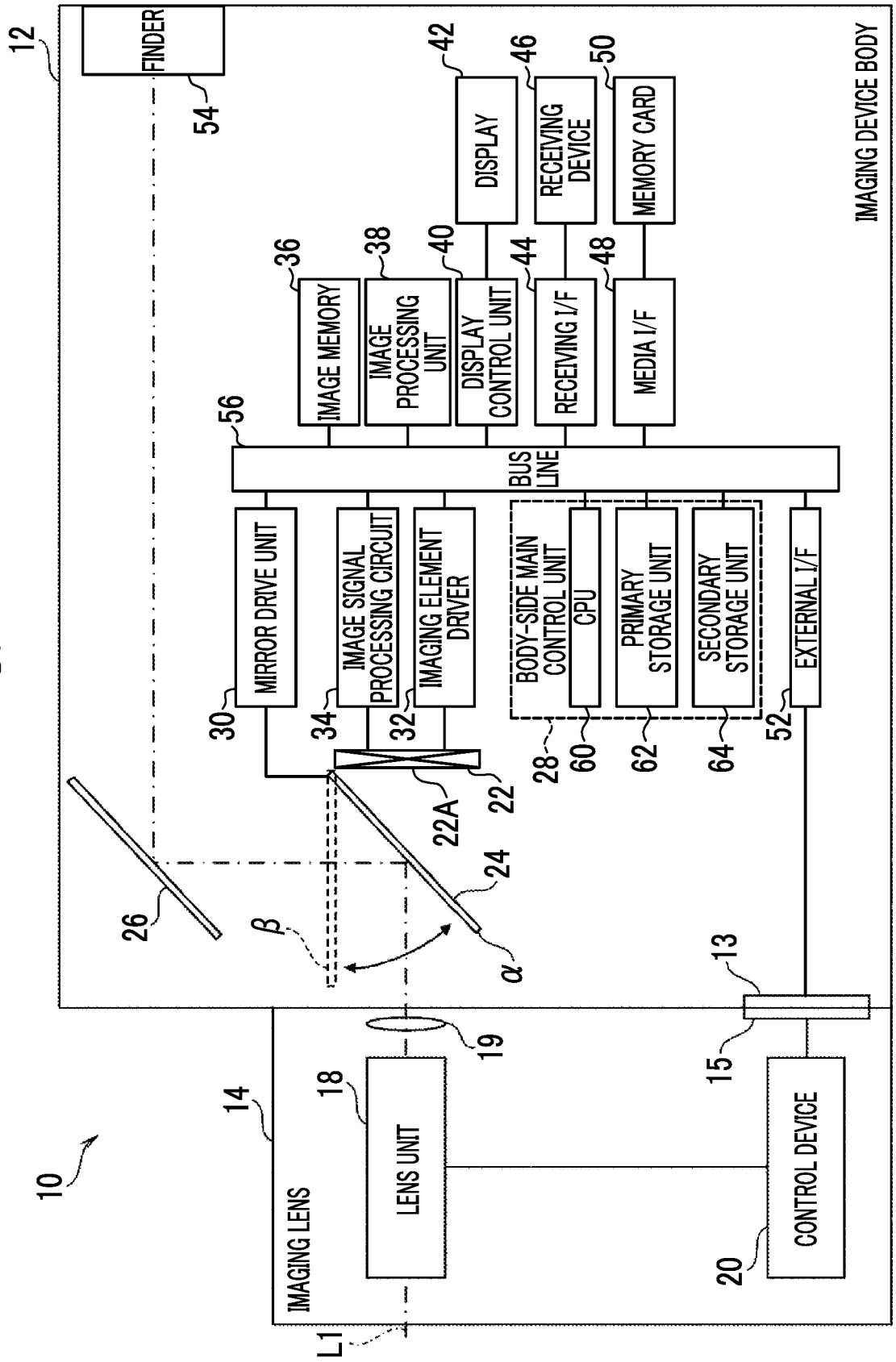
FIG. 1 is a block diagram showing an example of a hardware configuration of an imaging device according to each embodiment.

First, a configuration of an imaging device 10 according to the embodiment will be described with reference to FIGS. 1 and 2. As shown in FIG. 1, the imaging device 10 is a lens-interchangeable digital camera, and includes an imaging device body 12 and an imaging lens 14. The imaging lens 14 is mounted on the imaging device body 12 to be interchangeable.

The imaging device 10 according to the embodiment has a static image capturing mode and a video capturing mode as operating modes of an imaging system. The static image capturing mode is an operating mode of recording a static image obtained by imaging a subject, and the video capturing mode is an operating mode of recording a video obtained by imaging a subject.

The static image capturing mode and the video capturing mode are selectively set in the imaging device 10 according to an instruction that is given to the imaging device 10 from a user. Further, in the static image capturing mode, a manual focus mode and an autofocus mode are selectively set according to an instruction that is given to the imaging device 10 from a user.

In the autofocus mode, a release button (not shown) provided on the imaging device body 12 is made to be in a half-pressed state to adjust imaging conditions and is then made to be in a fully-pressed state to perform main exposure. That is, after an auto exposure (AE) function works to set an exposure state by making the release button to be in the half-pressed state, an auto focus (AF) function works to perform focusing control, and imaging is performed in a case where the release button is made to be in the fully-pressed state.

The imaging device body 12 comprises a mount 13, and the imaging lens 14 comprises a mount 15. The mount 15 is joined to the mount 13 so that the imaging lens 14 is mounted on the imaging device body 12 to be interchangeable. The imaging lens 14 includes a lens unit 18, a stop 19, and a control device 20. The stop 19 is provided closer to the imaging device body 12 than the lens unit 18, and the stop 19 adjusts an amount of subject light transmitted through the lens unit 18 and guides the subject light into the imaging device body 12. The control device 20 is electrically connected to the imaging device body 12 through the mounts 13 and 15, and controls the entire imaging lens 14 according to an instruction from the imaging device body 12.

The imaging device body 12 includes an imaging element 22, a first mirror 24, a second mirror 26, a body-side main control unit 28, a mirror drive unit 30, an imaging element driver 32, an image signal processing circuit 34, an image memory 36, an image processing unit 38, a display control unit 40, and a display 42. In addition, the imaging device body 12 further includes a receiving interface (I/F) 44, a receiving device 46, a media I/F 48, a memory card 50, an external I/F 52, and a finder 54.

The body-side main control unit 28 is an example of a computer according to the technique of the present disclosure, and comprises a central processing unit (CPU) 60, a primary storage unit 62, and a secondary storage unit 64. The CPU 60 controls the entire imaging device 10. The primary storage unit 62 is a volatile memory that is used as a work area and the like at the time of execution of various programs. Examples of the primary storage unit 62 include a random access memory (RAM). The secondary storage unit 64 is a non-volatile memory that stores various programs, various parameters, and the like in advance. Examples of the secondary storage unit 64 include a flash memory.

The CPU 60, the primary storage unit 62, and the secondary storage unit 64 are connected to a bus line 56. In addition, the mirror drive unit 30, the imaging element driver 32, the image signal processing circuit 34, the image memory 36, the image processing unit 38, the display control unit 40, the receiving I/F 44, the media I/F 48, and the external I/F 52 are also connected to the bus line 56.

The first mirror 24 is a movable mirror that is interposed between a light-receiving surface 22A of the imaging element 22 and the lens unit 18 and is movable between a light-receiving surface covering position α and a light-receiving surface opening position β. The first mirror 24 is connected to the mirror drive unit 30, and the mirror drive unit 30 drives the first mirror 24 under the control of the CPU 60 to selectively dispose the first mirror 24 at the light-receiving surface covering position a and the light-receiving surface opening position β. That is, the first mirror 24 is disposed at the light-receiving surface covering position α by the mirror drive unit 30 in a case where subject light is not to be received by the light-receiving surface 22A, and the first mirror 24 is disposed at the light-receiving surface opening position β by the mirror drive unit 30 in a case where subject light is to be received by the light-receiving surface 22A.

At the light-receiving surface covering position a, the first mirror 24 covers the light-receiving surface 22A and reflects the subject light, which is guided from the lens unit 18, to guide the subject light to the second mirror 26. The second mirror 26 reflects the subject light, which is guided from the first mirror 24, to guide the subject light to the finder 54 through the optical system (not shown). The finder 54 transmits the subject light that is guided by the second mirror 26. At the light-receiving surface opening position β, a state where the light-receiving surface 22A is covered with the first mirror 24 is released, and subject light is received by the light-receiving surface 22A without being reflected by the first mirror 24.

The imaging element driver 32 is connected to the imaging element 22, and supplies driving pulses to the imaging element 22 under the control of the CPU 60. Respective pixels of the imaging element 22 are driven according to the driving pulses that are supplied by the imaging element driver 32. In the embodiment, a charge coupled device (CCD) image sensor is used as the imaging element 22, but the technique of the present disclosure is not limited thereto and other image sensors such as a complementary metal oxide semiconductor (CMOS) image sensor may be used.

The image signal processing circuit 34 reads, for each pixel, image signals corresponding to one frame from the imaging element 22 under the control of the CPU 60. The image signal processing circuit 34 performs various kinds of processing, such as correlated double sampling processing, automatic gain control, and A/D conversion, on the read image signals. The image signal processing circuit 34 outputs digitized image signals, which are obtained by performing various kinds of processing on the image signals, to the image memory 36 for each frame at a predetermined frame rate (for example, several tens of frames/second) that is defined by a clock signal supplied from the CPU 60. The image memory 36 temporarily holds the image signals that are input from the image signal processing circuit 34.

The image processing unit 38 acquires image signals from the image memory 36 for each frame at a predetermined frame rate, and performs various kinds of processing, such as gamma correction, brightness/color difference conversion, and compression processing, on the acquired image signals. In addition, the image processing unit 38 outputs the image signals, which are obtained through the various kinds of processing, to the display control unit 40 for each frame at a predetermined frame rate. Further, the image processing unit 38 outputs the image signals, which are obtained through the various kinds of processing, to the CPU 60 in response to the request of the CPU 60.

The display control unit 40 is connected to the display 42, and controls the display 42 under the control of the CPU 60. Further, the display control unit 40 outputs the image signals, which are input from the image processing unit 38, to the display 42 for each frame at a predetermined frame rate. The display 42 displays an image represented by the image signals which are input at a predetermined frame rate from the display control unit 40, as a live view image. Further, the display 42 also displays a static image that is a single frame image obtained through imaging with a single frame. A menu screen and the like are also displayed on the display 42 in addition to the live view image.

The receiving device 46 includes a dial, the release button, a cross key, a MENU key, a touch panel, and the like which are not shown, and receives various instructions from a user. The receiving device 46 is connected to the receiving I/F 44, and outputs an instruction content signal indicating the contents of the received instruction, to the receiving I/F 44. The receiving I/F 44 outputs the instruction content signal, which is input from the receiving device 46, to the CPU 60. The CPU 60 executes processing corresponding to the instruction content signal input from the receiving I/F 44.

The media I/F 48 is connected to the memory card 50, and performs recording and reading of an image file with respect to the memory card 50 under the control of the CPU 60. Under the control of the CPU 60, the image file that is read from the memory card 50 by the media I/F 48 is subjected to decompression processing by the image processing unit 38 to be displayed on the display 42 as a playback image.

The mount 15 is connected to the mount 13 so that the external I/F 52 is connected to the control device 20 of the imaging lens 14, and the external I/F 52 takes charge of transmission and reception of various kinds of information between the CPU 60 and the control device 20.

Figure 2:
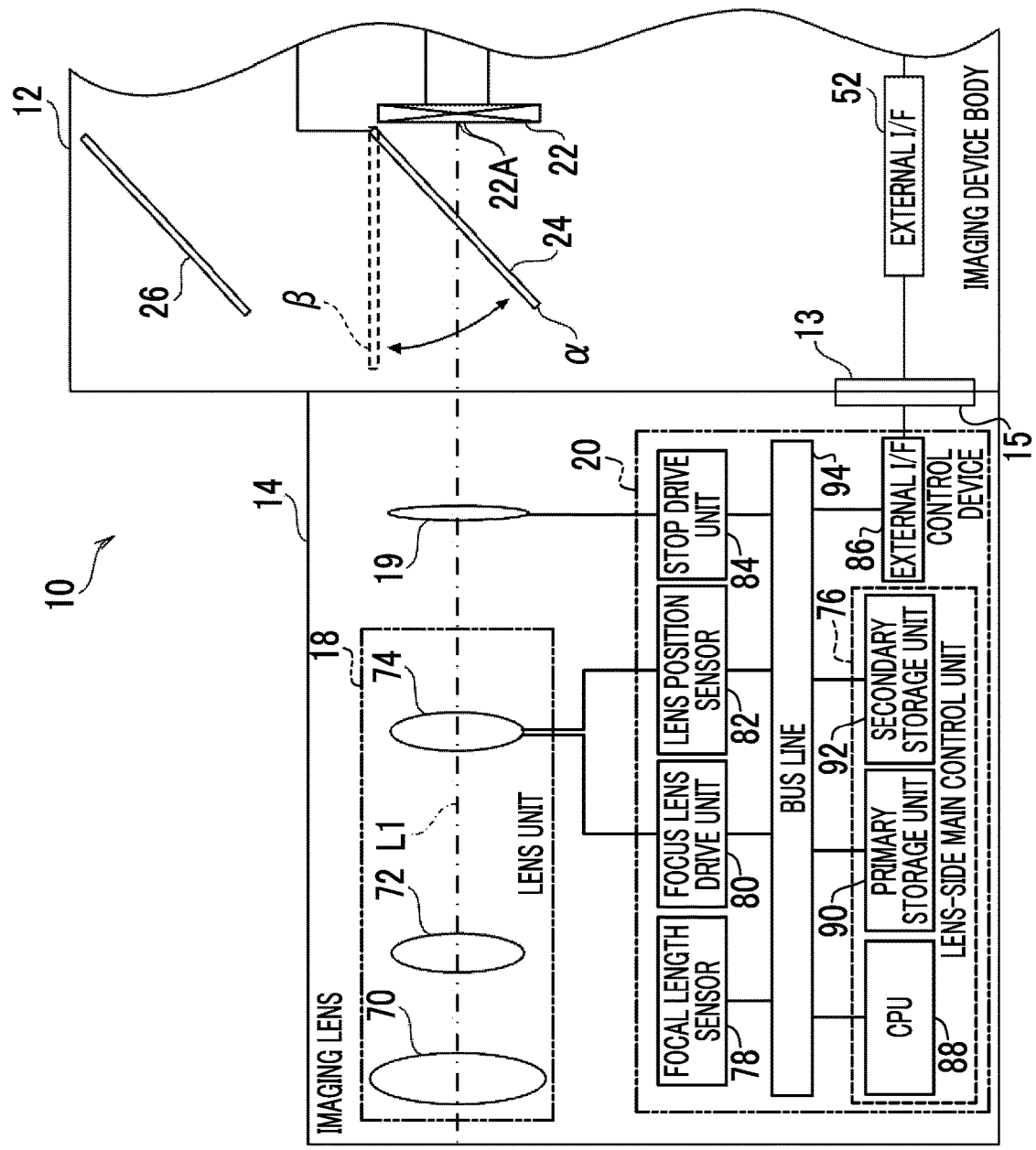
FIG. 2 is a block diagram showing an example of a hardware configuration of an imaging lens included in the imaging device according to each embodiment.

As shown in FIG. 2, for example, the lens unit 18 according to the embodiment includes an incident lens 70, a zoom lens 72, and a focus lens 74. The incident lens 70, the zoom lens 72, and the focus lens 74 are arranged along an optical axis L1; and the focus lens 74, the zoom lens 72, and the incident lens 70 are arranged along the optical axis L1 in this order from the stop 19 side.

Subject light is incident on the incident lens 70. The incident lens 70 transmits the subject light and guides the subject light to the zoom lens 72. The zoom lens 72 according to the embodiment includes a plurality of lenses that are movable along the optical axis L1, and the focal length of the imaging lens 14 (hereinafter, simply referred to as a "focal length") is adjusted by adjusting the state of the zoom lens 72. Specifically, in the zoom lens 72, a zoom ring (not shown) provided in the imaging lens 14 is rotated to cause respective lenses to be close to each other or to be far from each other along the optical axis L1 so that the positional relationship of the lenses along the optical axis L1 is adjusted, and thereby the focal length is adjusted. The zoom lens 72 transmits the subject light, which is incident from the incident lens 70, and guides the subject light to the focus lens 74.

The focus lens 74 is a lens movable along the optical axis L1, and is moved along the optical axis L1 to change the focus state of a subject image that is formed on the light-receiving surface 22A of the imaging element 22. The focus lens 74 transmits the subject light, which is incident from the zoom lens 72, and guides the subject light to the stop 19. The stop 19 adjusts the amount of the subject light that is incident from the focus lens 74, transmits the subject light, and guides the subject light to the imaging device body 12.

The control device 20 of the imaging lens 14 includes a lens-side main control unit 76, a focal length sensor 78, a focus lens drive unit 80, a lens position sensor 82, a stop drive unit 84, and an external I/F 86.

The lens-side main control unit 76 comprises a CPU 88, a primary storage unit 90, and a secondary storage unit 92. The CPU 88 controls the entire imaging lens 14. The primary storage unit 90 is a volatile memory that is used as a work area and the like at the time of execution of various programs. Examples of the primary storage unit 90 include a RAM. The secondary storage unit 92 is a non-volatile memory that stores various programs, various parameters, and the like in advance. Examples of the secondary storage unit 92 include a flash memory.

The CPU 88, the primary storage unit 90, and the secondary storage unit 92 are connected to a bus line 94. Further, the focal length sensor 78, the focus lens drive unit 80, the lens position sensor 82, the stop drive unit 84, and the external I/F 86 are also connected to the bus line 94.

The mount 15 is connected to the mount 13 so that the external I/F 86 is connected to the external I/F 52 of the imaging device body 12, and the external I/F 86 takes charge of transmission and reception of various kinds of information between the CPU 88 and the CPU 60 of the imaging device body 12 in cooperation with the external I/F 52.

The focal length sensor 78 detects the state of the zoom lens 72 from the rotation state of the zoom ring, and converts the detected state of the zoom lens 72 into the focal length. Then, the focal length sensor 78 outputs focal length information indicating the focal length obtained by the conversion, to the CPU 88.

The focus lens drive unit 80 includes a focus lens-driving motor (not shown). The focus lens drive unit 80 moves the focus lens 74 along the optical axis L1 by operating the focus lens-driving motor under the control of the CPU 88 according to an instruction that is received by the receiving device 46. That is, the focus lens drive unit 80 moves the focus lens 74 along the optical axis L1 by operating the focus lens-driving motor according to an instruction from the CPU 88 and transmitting the power of the focus lens-driving motor to the focus lens 74. The lens position sensor 82 includes, for example, an encoder, and the lens position sensor 82 detects the position of the focus lens 74 along the optical axis L1, and outputs lens position information indicating the detected position, to the CPU 88.

The stop drive unit 84 includes a stop-driving motor (not shown). The stop drive unit 84 adjusts the size of the aperture of the stop 19 by operating the stop-driving motor under the control of the CPU 88 according to an instruction that is received by the receiving device 46.

Figure 3:
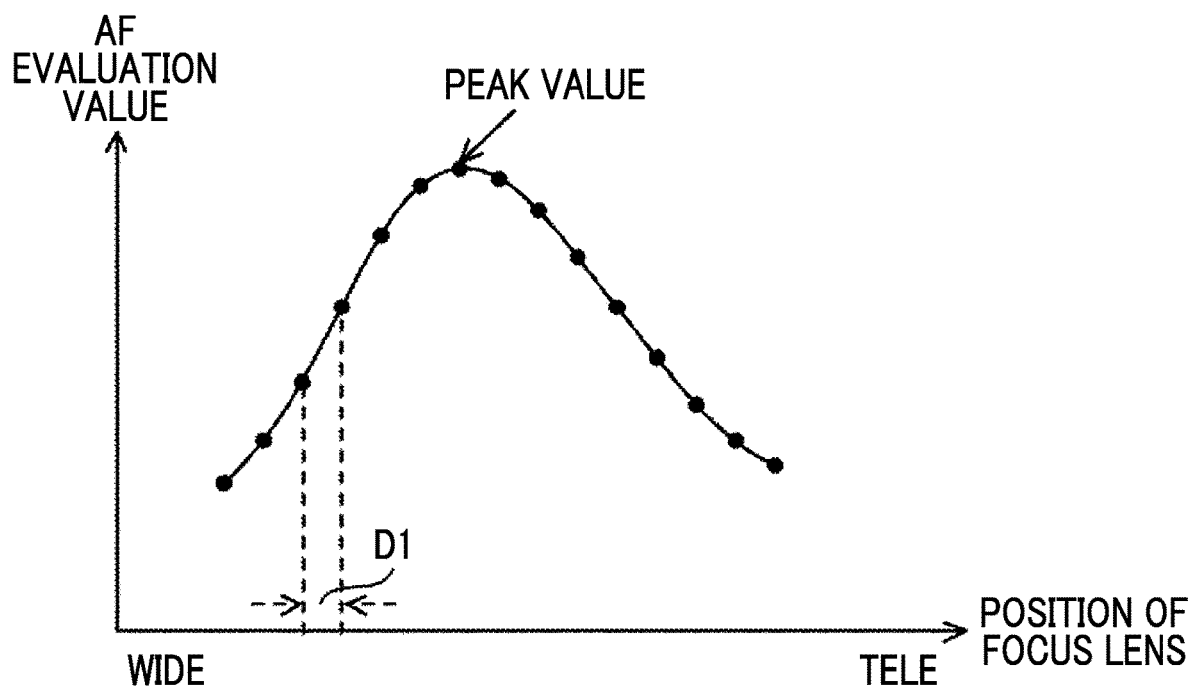
FIG. 3 is a graph for describing autofocus according to each embodiment.

The imaging device 10 according to the embodiment performs autofocus using a so-called contrast AF method. Specifically, the imaging device 10 according to the embodiment derives an evaluation value for the autofocus (hereinafter, referred to as "AF evaluation value") at a plurality of different positions while moving the focus lens 74 from the WIDE side to the TELE side along the optical axis L1 as shown in FIG. 3, for example. Then, the imaging device 10 performs focusing control by moving the focus lens 74 to a position where the derived AF evaluation value is the peak value. In the embodiment, as the AF evaluation value, a contrast value of an autofocus area is applied. Hereinafter, a distance (D1 shown in FIG. 3) between consecutive positions at the time of deriving the AF evaluation value while changing the position of the focus lens 74 is referred to as a "distance D1". The distance D1 may be the same or different between consecutive positions.

Figure 4:
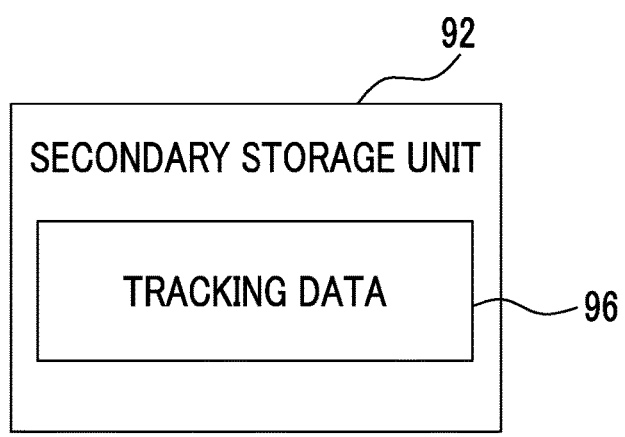
FIG. 4 is a conceptual diagram showing an example of contents stored in a secondary storage unit of a lens-side main control unit included in the imaging lens of the imaging device according to each embodiment.

As shown in FIG. 4, for example, the secondary storage unit 92 of the lens-side main control unit 76 stores tracking data 96. The tracking data 96 is data used in the zoom tracking control for changing the position of the focus lens 74 along the optical axis L1 according to the focal length.

Figure 5:
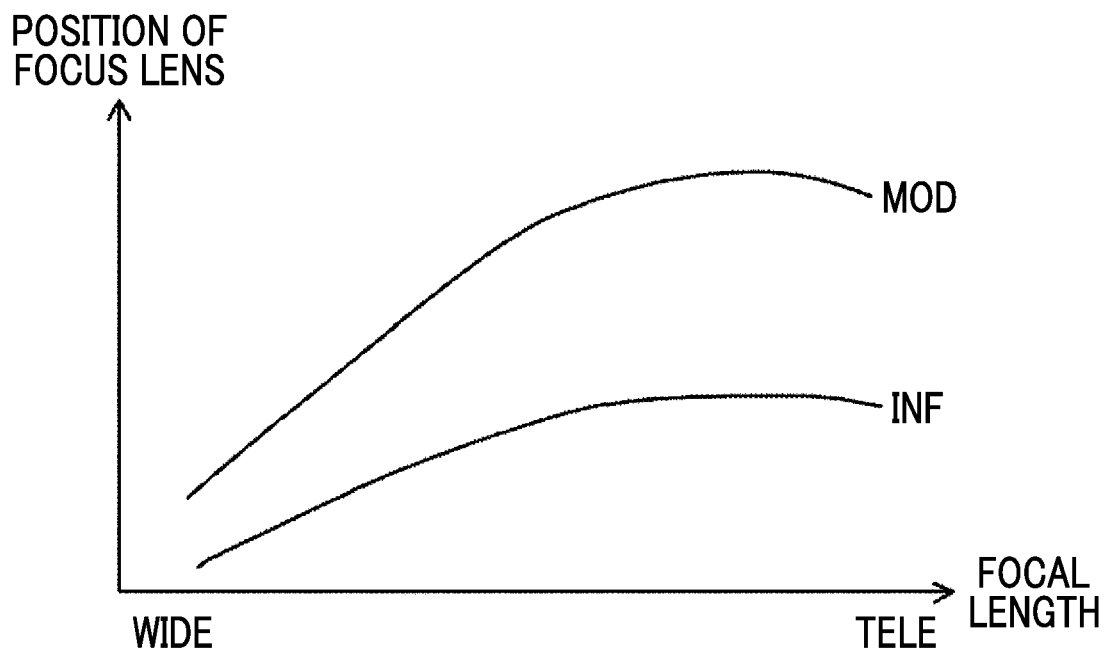
FIG. 5 is a graph for describing tracking data according to each embodiment.

As shown in FIG. 5, for example, the tracking data 96 includes data indicating a correspondence relationship between the position of the focus lens 74 along the optical axis L1 and the focal length in a case where an imaging distance from the light-receiving surface 22A to the subject (hereinafter, simply referred to as an "imaging distance") is infinity (INF). Further, the tracking data 96 includes data indicating a correspondence relationship between the position of the focus lens 74 along the optical axis L1 and the focal length in a case where the imaging distance is the minimum object distance (MOD). Hereinafter, in case of simply describing the position of the focus lens 74, it represents the position of the focus lens 74 along the optical axis L1.

Figure 6:
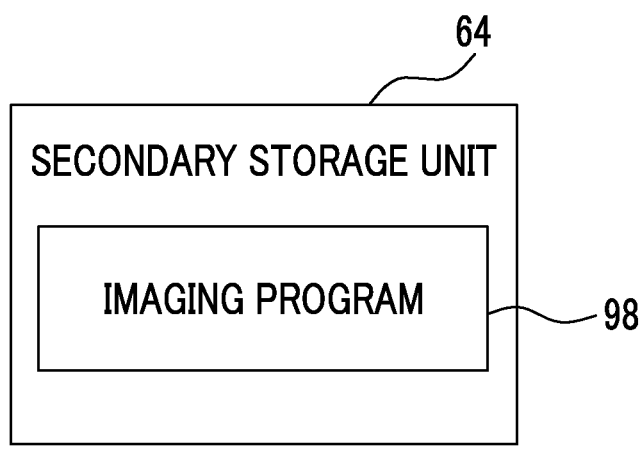
FIG. 6 is a conceptual diagram showing an example of contents stored in a secondary storage unit of a body-side main control unit included in an imaging device body of the imaging device according to each embodiment.

On the other hand, as shown in FIG. 6, for example, the secondary storage unit 64 of the body-side main control unit 28 stores an imaging program 98. The CPU 60 reads the imaging program 98 from the secondary storage unit 64, develops the imaging program 98 in the primary storage unit 62, and executes imaging processing (refer to FIG. 7), which will be described below, according to the developed imaging program 98. In other words, the CPU 60 operates as an acquisition unit and a control unit by executing the imaging program 98.

Next, the operation of the imaging device 10 according to the embodiment will be described with reference to FIG. 7.

Figure 7:
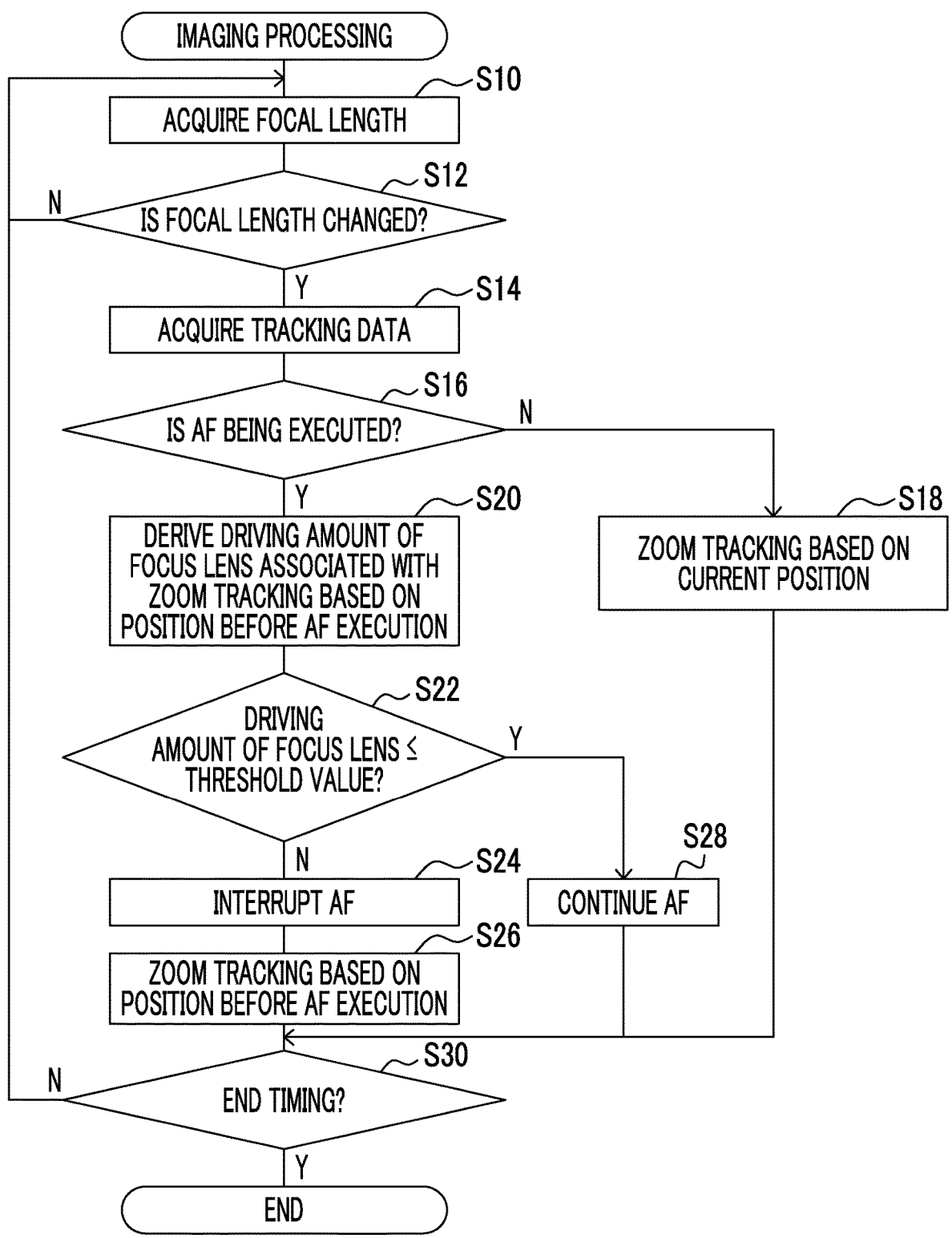
FIG. 7 is a flowchart showing an example of imaging processing according to a first embodiment.

The imaging processing shown in FIG. 7 is executed in a case where the power switch of the imaging device 10 is turned on, for example.

In step S10 of FIG. 7, the CPU 60 acquires a focal length via the external I/F 52. Specifically, the CPU 60 outputs an instruction for acquiring a focal length to the CPU 88. In a case where the instruction for acquiring the focal length is input from the CPU 60, the CPU 88 acquires the focal length detected by the focal length sensor 78. Then, the CPU 88 outputs the acquired focal length to the CPU 60.

In step S12, the CPU 60 determines whether the focal length acquired in current step S10 (performed immediately before) is changed from the focal length acquired in previous step S10. In a case where the determination is negative, the processing returns to step S10, and in a case where the determination is affirmative, the processing proceeds to step S14. In step S12, even in a case where the focal length acquired in current step S10 is changed from the focal length acquired in previous step S10, when the change amount is within an allowable error range, the CPU 60 may determine that the focal length is not changed.

In step S14, the CPU 60 acquires the tracking data 96 via the external I/F 52. Specifically, the CPU 60 outputs an instruction for acquiring the tracking data 96 to the CPU 88. In a case where the instruction for acquiring the tracking data 96 is input from the CPU 60, the CPU 88 reads the tracking data 96 from the secondary storage unit 92. Then, the CPU 88 outputs the read tracking data 96 to the CPU 60.

In step S16, the CPU 60 determines whether the autofocus is being executed. In a case where the determination is negative, the processing proceeds to step S18, and in a case where the determination is affirmative, the processing proceeds to step S20.

Figure 8:
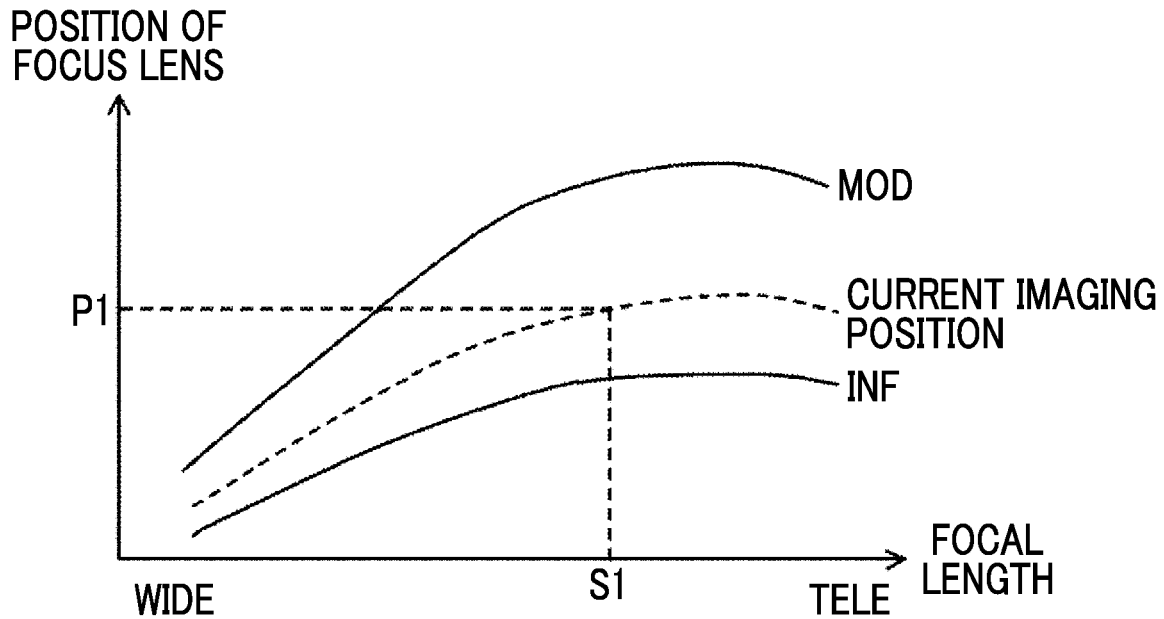
FIG. 8 is a graph for describing a zoom tracking control based on a current position according to each embodiment.

In step S18, the CPU 60 performs the zoom tracking control based on the current position of the focus lens 74. Specifically, as shown in FIG. 8, for example, the CPU 60 derives a tracking curve (dashed curve in the example of FIG. 8) corresponding to the current imaging distance by interpolation processing using a tracking curve with an imaging distance of MOD and a tracking curve with an imaging distance of INF included in the tracking data 96. Further, the CPU 60 derives a position P1 of the focus lens 74 corresponding to a focal length S1, which is acquired in step S10 performed immediately before, using the derived tracking curve. Then, the CPU 60 outputs an instruction for moving the focus lens 74 to the derived position P1, to the CPU 88. In a case where the instruction for moving the focus lens 74 is input from the CPU 60, the CPU 88 controls the focus lens drive unit 80 to move the focus lens 74 to the position P1 input from the CPU 60. In a case where the processing of step S18 is ended, the processing proceeds to step S30.

Figure 9:
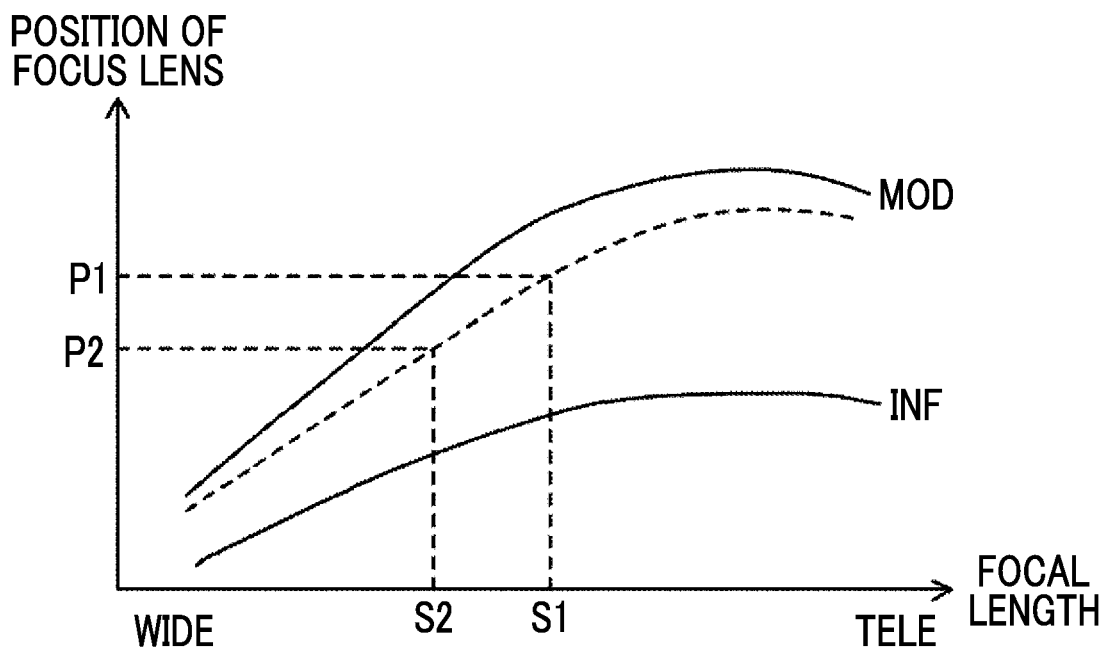
FIG. 9 is a graph for describing a zoom tracking control based on a position of the focus lens before execution of autofocus according to first, third, and fourth embodiments.

On the other hand, in step S20, the CPU 60 derives a driving amount of the focus lens 74 at the time of performing the zoom tracking control based on the position of the focus lens 74 before the execution of the autofocus. Specifically, as shown in FIG. 9, for example, the CPU 60 interpolates between the tracking curve with the imaging distance of MOD and the tracking curve with the imaging distance of INF, using a focal length S2 and a position P2 of the focus lens 74 before the execution of the autofocus. Through this interpolation, the CPU 60 derives a tracking curve (dashed curve in the example of FIG. 9) based on the position of the focus lens 74 before the execution of the autofocus.

Further, the CPU 60 derives the position P1 of the focus lens 74 corresponding to the focal length S1, which is acquired in step S10 performed immediately before, using the derived tracking curve. Then, the CPU 60 derives the driving amount of the focus lens 74 from the current position of the focus lens 74 to the position P1. The CPU 60 acquires the position detected by the lens position sensor 82 via the CPU 88, as the current position of the focus lens 74.

In step S22, the CPU 60 determines whether the driving amount of the focus lens 74 derived in step S20 is equal to or less than a threshold value TH1. In the embodiment, as the threshold value TH1, a value less than the distance D1 between the consecutive positions of the focus lens 74 at the time of deriving the AF evaluation value is applied. In a case where the determination is negative, the processing proceeds to step S24, and in a case where the determination is affirmative, the processing proceeds to step S28. In a case where the distance D1 between the consecutive positions of the focus lens 74 at the time of deriving the AF evaluation value is defined as n times the focal depth, a value that is a predetermined multiple (for example, n/2 times) of the focal depth may be applied as the threshold value TH1.

In step S24, the CPU 60 performs control to interrupt the autofocus. In step S26, the CPU 60 performs the zoom tracking control based on the position of the focus lens 74 before the execution of the autofocus. Specifically, the CPU 60 outputs an instruction for moving the focus lens 74 to the position P1 derived in step S20, to the CPU 88. In a case where the instruction for moving the focus lens 74 is input from the CPU 60, the CPU 88 controls the focus lens drive unit 80 to move the focus lens 74 to the position P1 input from the CPU 60. In a case where the processing of step S26 is ended, the processing proceeds to step S30.

On the other hand, in step S28, the CPU 60 performs control to continue the autofocus. In a case where the processing of step S28 is ended, the processing proceeds to step S30. In step S30, the CPU 60 determines whether an end timing of the present imaging processing has been reached. In a case where the determination is negative, the processing returns to step S10, and in a case where the determination is affirmative, the present imaging processing is ended. As an example of the end timing, a timing when the power switch of the imaging device 10 is turned off is exemplified.

As described above, according to the embodiment, in a case where the autofocus is not being executed, the zoom tracking control based on the current position of the focus lens 74 is performed (step S18). In a case where the autofocus is being executed, the zoom tracking control based on the position of the focus lens 74 before the execution of the autofocus is performed (step S26). Further, in a case where the autofocus is being executed, control is changed on the basis of the driving amount of the focus lens 74 at the time of performing the zoom tracking control based on the position of the focus lens 74 before the execution of the autofocus (step S22). Further, in a case where the driving amount of the focus lens 74 at the time of performing the zoom tracking control based on the position of the focus lens 74 before the execution of the autofocus is equal to or less than the threshold value TH1, the autofocus is continued. On the other hand, in a case where the driving amount exceeds the threshold value TH1, the autofocus is interrupted, and the zoom tracking control based on the position of the focus lens 74 before the execution of the autofocus is performed. Further, according to the embodiment, as the threshold value TH1, a value less than the distance D1 between the consecutive positions of the focus lens 74 at the time of deriving the AF evaluation value is applied.

That is, in a case where the driving amount of the focus lens 74 associated with the zoom tracking control exceeds the threshold value TH1, the possibility that the peak value of the AF evaluation value is not detected is relatively high, and therefore, the zoom tracking control based on the focusing position by the previous autofocus is performed. Further, in a case where the driving amount of the focus lens 74 associated with the zoom tracking control is equal to or less than the threshold value TH1, the possibility that the peak value of the AF evaluation value is detected is relatively high, and therefore, the autofocus is continued. Accordingly, it is possible to suppress a decrease in focusing accuracy while reducing the control time of the imaging device 10.

Second Embodiment

A second embodiment of the technique of the present disclosure will be described. The configuration of the imaging device 10 according to the embodiment is the same as that of the first embodiment (refer to FIGS. 1 and 2), and thus the description thereof will be omitted.

Figure 10:
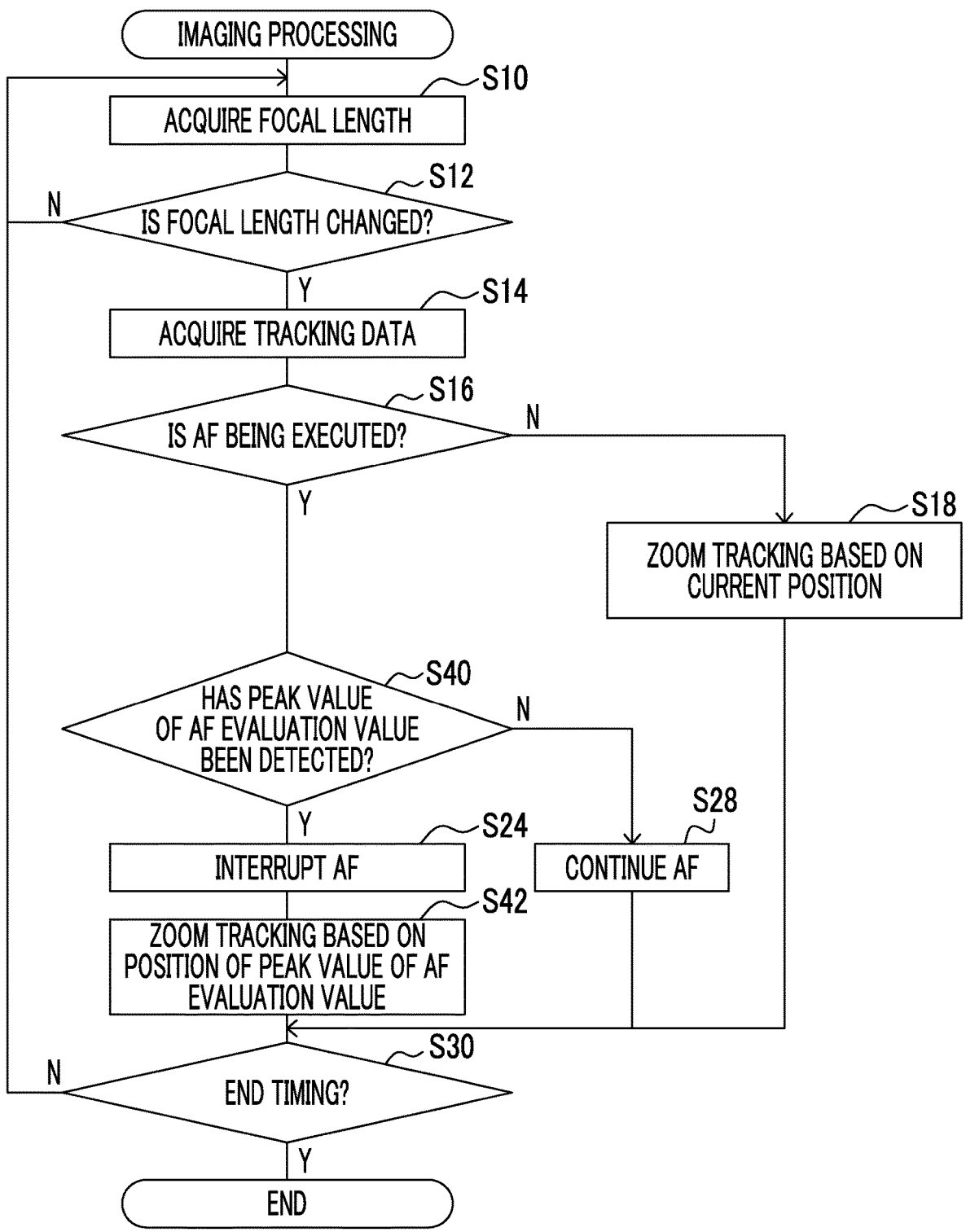
FIG. 10 is a flowchart showing an example of imaging processing according to a second embodiment.

The operation of the imaging device 10 according to the embodiment will be described with reference to FIG. 10. In FIG. 10, a step executing the same processing as that in FIG. 7 is denoted by the same step number as that in FIG. 7, and the description thereof will be omitted.

In step S40 of FIG. 10, the CPU 60 determines whether the peak value of the AF evaluation value has already been detected. In a case where the determination is affirmative, the processing proceeds to step S24, and in a case where the determination is negative, the processing proceeds to step S28.

Figure 11:
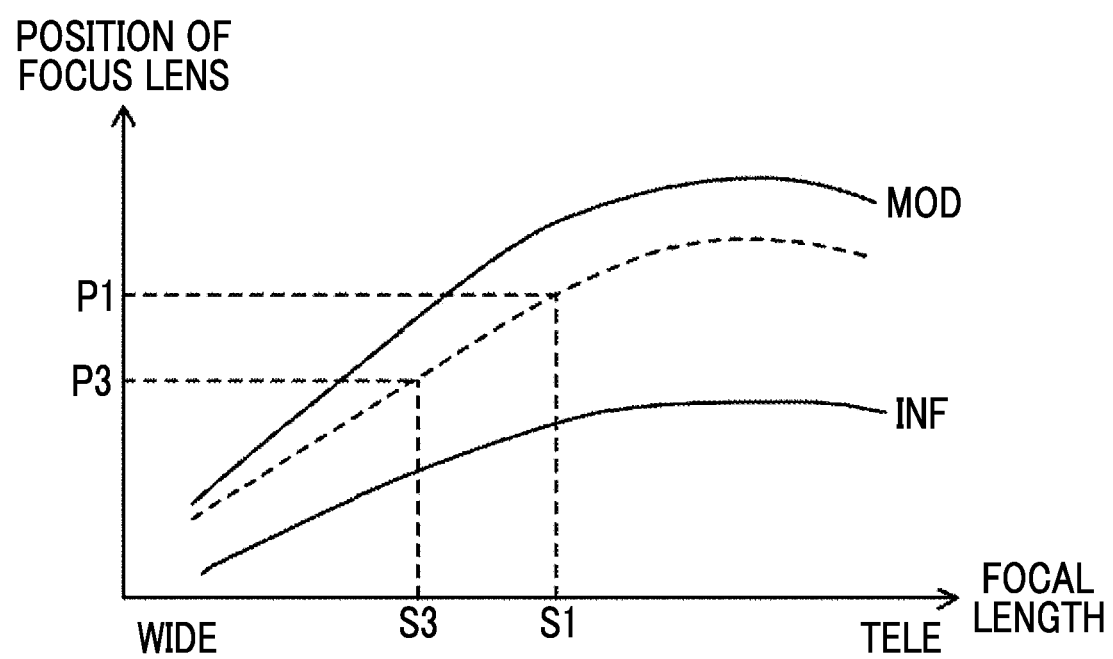
FIG. 11 is a graph for describing a zoom tracking control based on a position of the focus lens where an evaluation value of the autofocus is a peak value according to the second embodiment.

In step S42, the CPU 60 performs the zoom tracking control based on the position of the focus lens 74 corresponding to the peak value of the AF evaluation value. Specifically, as shown in FIG. 11, for example, the CPU 60 interpolates between the tracking curve with the imaging distance of MOD and the tracking curve with the imaging distance of INF, using a focal length S3 at the time of detecting the peak value and a position P3 of the focus lens 74 corresponding to the peak value of the AF evaluation value. Through this interpolation, the CPU 60 derives a tracking curve (dashed curve in the example of FIG. 11) based on the position of the focus lens 74 corresponding to the peak value of the AF evaluation value.

Further, the CPU 60 derives the position P1 of the focus lens 74 corresponding to the focal length S1, which is acquired in step S10 performed immediately before, using the derived tracking curve. Then, the CPU 60 outputs an instruction for moving the focus lens 74 to the derived position P1, to the CPU 88. In a case where the instruction for moving the focus lens 74 is input from the CPU 60, the CPU 88 controls the focus lens drive unit 80 to move the focus lens 74 to the position P1 input from the CPU 60. In a case where the processing of step S42 is ended, the processing proceeds to step S30.

As described above, according to the embodiment, in a case where a change in focal length is detected and the autofocus is being executed, the following control is performed depending on whether the peak value of the AF evaluation value has been detected. That is, in a case where the peak value of the AF evaluation value has been detected, the autofocus is interrupted, and the zoom tracking control based on the position of the focus lens 74 where the AF evaluation value is the peak value is performed. On the other hand, in a case where the peak value of the AF evaluation value has not been detected, the control to continue the autofocus is performed. Accordingly, it is possible to suppress a decrease in focusing accuracy while reducing the control time of the imaging device 10.

Third Embodiment

A third embodiment of the technique of the present disclosure will be described. The configuration of the imaging device 10 according to the embodiment is the same as that of the first embodiment (refer to FIGS. 1 and 2), and thus the description thereof will be omitted.

Figure 12:
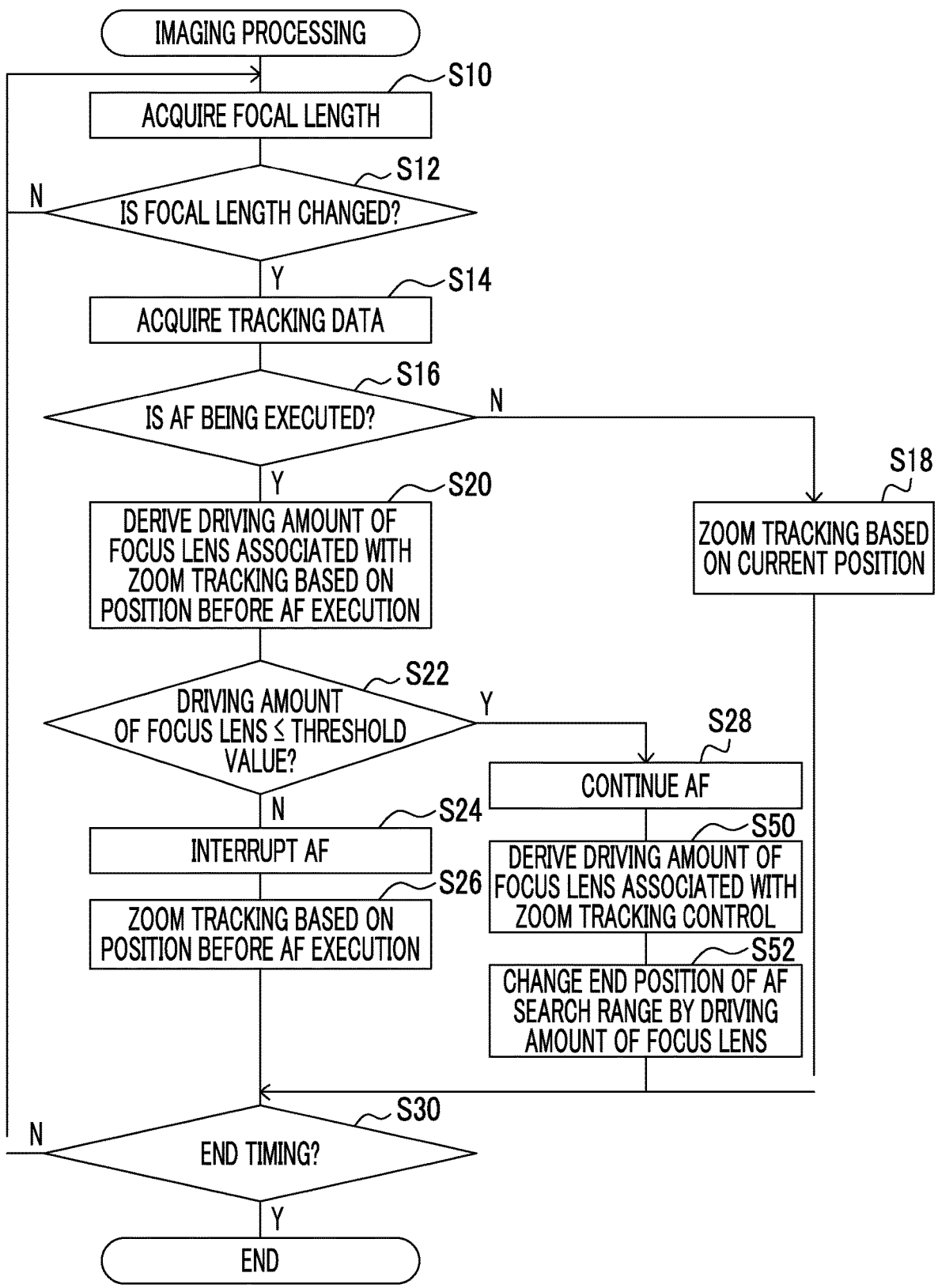
FIG. 12 is a flowchart showing an example of imaging processing according to a third embodiment.

The operation of the imaging device 10 according to the embodiment will be described with reference to FIG. 12. In FIG. 12, a step executing the same processing as that in FIG. 7 is denoted by the same step number as that in FIG. 7, and the description thereof will be omitted.

In step S50 of FIG. 12, similar to step S18, the CPU 60 derives the position P1 of the focus lens 74 corresponding to the focal length S1, which is acquired in step S10 performed immediately before. Then, the CPU 60 derives the driving amount of the focus lens 74 from the current position of the focus lens 74 to the position P1. The CPU 60 acquires the position detected by the lens position sensor 82 via the CPU 88, as the current position of the focus lens 74.

Figure 13:
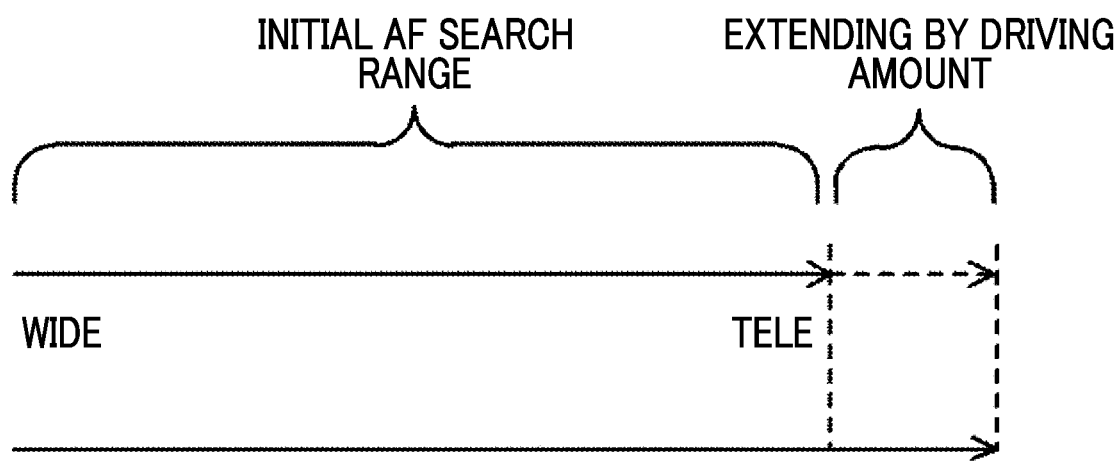
FIG. 13 is a diagram for describing a process of changing an end position of a search range of the autofocus according to third and fourth embodiments.

In step S52, the CPU 60 performs control to continue the autofocus by changing the end position of the search range of the autofocus by the driving amount derived in step S50. In the embodiment, in a case where a driving direction of the focus lens 74 associated with the zoom tracking control is the same as a search direction of the autofocus, the CPU 60 extends the search range of the autofocus by the driving amount derived in step S50, as shown in FIG. 13, for example. On the other hand, in a case where a driving direction of the focus lens 74 associated with the zoom tracking control is opposite to a search direction of the autofocus, the CPU 60 narrows the search range of the autofocus by the driving amount derived in step S50. In a case where the processing of step S52 is ended, the processing proceeds to step S30.

As described above, according to the embodiment, the end position of the search range of the autofocus is changed by the driving amount of the focus lens 74 associated with the zoom tracking control. Accordingly, it is possible to further suppress a decrease in focusing accuracy.

Fourth Embodiment

A fourth embodiment of the technique of the present disclosure will be described. The configuration of the imaging device 10 according to the embodiment is the same as that of the first embodiment (refer to FIGS. 1 and 2), and thus the description thereof will be omitted.

Figure 14:
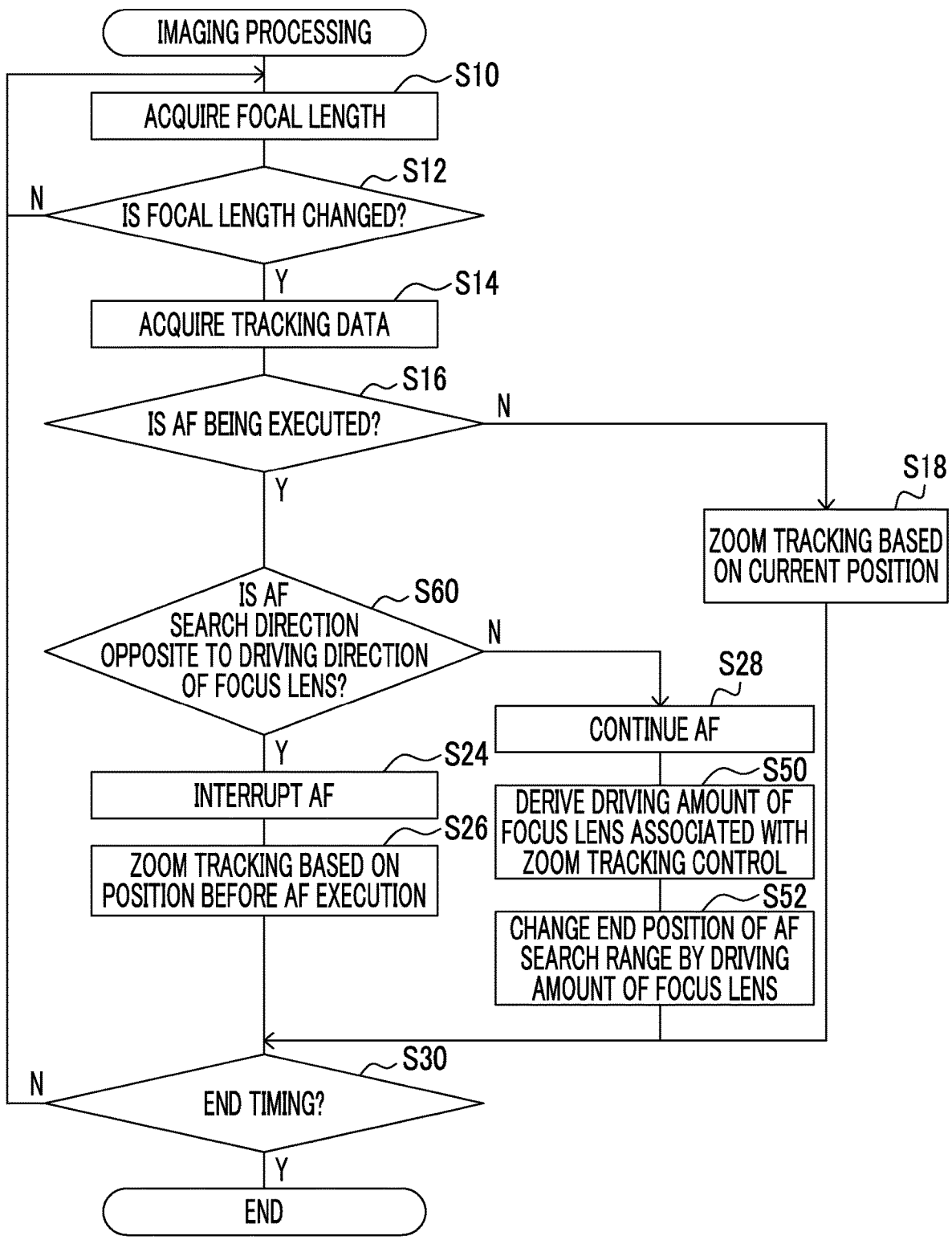
FIG. 14 is a flowchart showing an example of imaging processing according to a fourth embodiment.

The operation of the imaging device 10 according to the embodiment will be described with reference to FIG. 14. In FIG. 14, a step executing the same processing as that in FIG. 12 is denoted by the same step number as that in FIG. 12, and the description thereof will be omitted.

In step S60 of FIG. 14, similar to step S18, the CPU 60 derives the position P1 of the focus lens 74 corresponding to the focal length S1, which is acquired in step S10 performed immediately before. Then, the CPU 60 determines whether the search direction of the autofocus is opposite to the driving direction of the focus lens 74 from the current position of the focus lens 74 to the position P1. In a case where the determination is affirmative, the processing proceeds to step S24, and in a case where the determination is negative, the processing proceeds to step S28.

As described above, according to the embodiment, in a case where the search direction of the autofocus is the same as the driving direction of the focus lens 74 associated with the zoom tracking control, the autofocus is continued. On the other hand, in a case where the search direction is opposite to the driving direction, the autofocus is interrupted, and the zoom tracking control based on the position of the focus lens 74 before the execution of the autofocus is performed. Accordingly, it is possible to suppress a decrease in focusing accuracy while reducing the control time of the imaging device 10.

In addition, the imaging processing executed by the CPU executing software (program) in each embodiment described above may be executed by various processors other than the CPU. As the various processors in this case, a programmable logic device (PLD) of which the circuit configuration can be changed after manufacture, such as a field-programmable gate array (FPGA), and a dedicated electrical circuitry, which is a processor having a circuit configuration designed exclusively to execute specific processing, such as an application specific integrated circuit (ASIC) are exemplified. Further, the imaging processing may be executed by one of the various processors, or executed by the combination of the same or different kinds of two or more processors (for example, combination of a plurality of FPGAs, combination of the CPU and the FPGA, or the like). Furthermore, the hardware structures of the various processors are more specifically electrical circuitry where circuit elements, such as semiconductor elements, are combined.

In the embodiments described above, an aspect in which the imaging program 98 is stored (installed) in the secondary storage unit 64 in advance is described, but the present disclosure is not limited thereto. The imaging program 98 may be provided by being recorded in a recording medium such as a compact disk read only memory (CD-ROM), a digital versatile disk read only memory (DVD-ROM), and a Universal Serial Bus (USB) memory. In addition, the imaging program 98 may be downloaded from external devices via a network.

This application claims the priority of Japanese Patent Application No. 2017-186448, filed on Sep. 27, 2017, the entire contents of which are incorporated herein by reference. All documents, patent applications, and technical standards disclosed in this specification are incorporated in this specification by reference to the same extent as if the documents, the patent applications, and the technical standards were specifically and individually stated to be incorporated by reference.

What is claimed is:

1. An imaging device, comprising:
a processor; and
an imaging lens having an imaging optical system including a focus lens, wherein the processor is configured to:
acquire a focal length of the imaging lens,
perform zoom tracking control to change a state of the focus lens according to the acquired focal length,
in a case in which a change of the acquired focal length is detected, vary a criterion in the zoom tracking control depending on whether or not autofocus is being executed,
in a case in which the autofocus is not being executed, perform the zoom tracking control based on a current position of the focus lens, and
in a case in which the autofocus is being executed, perform the zoom tracking control based on a position of the focus lens before execution of the autofocus.

2. The imaging device according to claim 1, wherein, in a case in which the autofocus is being executed, the processor changes control on the basis of a driving amount of the focus lens at a time of performing the zoom tracking control based on the position of the focus lens before execution of the autofocus.

3. The imaging device according to claim 2, wherein, in a case in which a change of the acquired focal length is detected and the autofocus is being executed, when the driving amount of the focus lens at the time of performing the zoom tracking control based on the position of the focus lens before execution of the autofocus is equal to or less than a threshold value, the processor continues the autofocus, and when the driving amount exceeds the threshold value, the processor interrupts the autofocus and performs the zoom tracking control based on the position of the focus lens before execution of the autofocus.

4. The imaging device according to claim 3, wherein the threshold value is less than a distance between consecutive positions at a time of deriving an evaluation value of the autofocus while changing the position of the focus lens.

5. The imaging device according to claim 3, wherein, in a case in which a change of the acquired focal length is detected, the autofocus is being executed, and the autofocus is continued, the processor performs control to perform the autofocus by changing an end position of a search range of the autofocus by the driving amount of the focus lens associated with the zoom tracking control.

6. An imaging device, comprising:
a processor; and
an imaging lens having an imaging optical system including a focus lens, wherein the processor is configured to:
acquire a focal length of the imaging lens,
perform zoom tracking control to change a state of the focus lens according to the acquired focal length,
in a case in which a change of the acquired focal length is detected, vary a criterion in the zoom tracking control depending on whether or not autofocus is being executed, and
in a case in which a change of the acquired focal length is detected and the autofocus is being executed, when a peak value of an evaluation value of the autofocus has been detected, interrupt the autofocus and perform the zoom tracking control based on a position of the focus lens at which the evaluation value is the peak value, and when the peak value of the evaluation value has not been detected, perform control to continue the autofocus.

7. An imaging device, comprising:
a processor; and
an imaging lens having an imaging optical system including a focus lens, wherein the processor is configured to:
acquire a focal length of the imaging lens,
perform zoom tracking control to change a state of the focus lens according to the acquired focal length,
in a case in which a change of the acquired focal length is detected, vary a criterion in the zoom tracking control depending on whether or not autofocus is being executed, and
in a case in which a change of the acquired focal length is detected and the autofocus is being executed, when a search direction of the autofocus is opposite to a driving direction of the focus lens associated with the zoom tracking control, interrupt the autofocus and perform the zoom tracking control based on a position of the focus lens before execution of the autofocus, and when the search direction is the same as the driving direction, perform control to continue the autofocus.

8. An imaging device comprising:
a processor; and
an imaging lens having an imaging optical system including a focus lens, wherein the processor is configured to:
acquire a focal length of the imaging lens,
perform zoom tracking control to change a state of the focus lens according to the acquired focal length, and
in a case in which a change of the acquired focal length is detected and the autofocus is being executed, when a peak value of an evaluation value of the autofocus has been detected, interrupt the autofocus and perform the zoom tracking control based on a position of the focus lens at which the evaluation value is the peak value,
in a case in which a change of the acquired focal length is detected, vary a criterion in the zoom tracking control depending on whether or not autofocus is being executed, and
in a case in which a change of the acquired focal length by an acquisition unit is detected and the autofocus is not being executed, perform the zoom tracking control based on a current position of the focus lens.

9. An imaging method executed by an imaging device comprising an imaging lens having a processor and an imaging optical system including a focus lens, the imaging method comprising:
acquiring a focal length of the imaging lens;
performing zoom tracking control to change a state of the focus lens according to the acquired focal length;
in a case in which a change of the acquired focal length is detected, varying a criterion in the zoom tracking control depending on whether or not autofocus is being executed;
in a case in which the autofocus is not being executed, performing the zoom tracking control based on a current position of the focus lens; and
in a case in which the autofocus is being executed, performing the zoom tracking control based on a position of the focus lens before execution of the autofocus.

10. An imaging method executed by an imaging device comprising an imaging lens having a processor and an imaging optical system including a focus lens, the imaging method comprising:
acquiring a focal length of the imaging lens;
performing zoom tracking control to change a state of the focus lens according to the acquired focal length;
in a case in which a change of the acquired focal length is detected, varying a criterion in the zoom tracking control depending on whether or not autofocus is being executed; and
in a case in which a change of the acquired focal length is detected and the autofocus is being executed, when a peak value of an evaluation value of the autofocus has been detected, interrupting the autofocus and performing the zoom tracking control based on a position of the focus lens at which the evaluation value is the peak value, and when the peak value of the evaluation value has not been detected, performing control to continue the autofocus.

11. An imaging method executed by an imaging device comprising an imaging lens having a processor and an imaging optical system including a focus lens, the imaging method comprising:
acquiring a focal length of the imaging lens;
performing zoom tracking control to change a state of the focus lens according to the acquired focal length;
in a case in which a change of the acquired focal length is detected, varying a criterion in the zoom tracking control depending on whether or not autofocus is being executed; and
in a case in which a change of the acquired focal length is detected and the autofocus is being executed, when a search direction of the autofocus is opposite to a driving direction of the focus lens associated with the zoom tracking control, interrupting the autofocus and performing the zoom tracking control based on a position of the focus lens before execution of the autofocus, and when the search direction is the same as the driving direction, performing control to continue the autofocus.

12. An imaging method executed by an imaging device comprising an imaging lens having a processor and an imaging optical system including a focus lens, the imaging method comprising:
acquiring a focal length of the imaging lens;
performing zoom tracking control to change a state of the focus lens according to the acquired focal length;
in a case in which a change of the acquired focal length is detected and the autofocus is being executed, when a peak value of an evaluation value of the autofocus has been detected, interrupting the autofocus and performing the zoom tracking control based on a position of the focus lens at which the evaluation value is the peak value;
in a case in which a change of the acquired focal length is detected, varying a criterion in the zoom tracking control depending on whether autofocus is being executed or not;
in a case in which a change of the acquired focal length by an acquisition unit is detected and the autofocus is not being executed, performing the zoom tracking control based on a current position of the focus lens.

13. A non-transitory computer-readable storage medium storing a program for causing a computer of an imaging device comprising an imaging lens having an imaging optical system including a focus lens to execute processing comprising:
acquiring a focal length of the imaging lens;
when performing zoom tracking control to change a state of the focus lens according to the acquired focal length,
in a case in which a change of the acquired focal length is detected, varying a criterion in the zoom tracking control depending on whether or not autofocus is being executed;
in a case in which the autofocus is not being executed, performing the zoom tracking control based on a current position of the focus lens; and
in a case in which the autofocus is being executed, performing the zoom tracking control based on a position of the focus lens before execution of the autofocus.

* * * * *